US012287912B2

(12) United States Patent
Lin et al.

(10) Patent No.: US 12,287,912 B2
(45) Date of Patent: Apr. 29, 2025

(54) EXTERNAL DEVICE COMMUNICATION WITH VIRTUAL REALITY EQUIPMENT

(71) Applicant: International Business Machines Corporation, Armonk, NY (US)

(72) Inventors: June-Ray Lin, Taipei (TW); Jia Mao, Shanghai (CN); Nuo Xu, Hangzhou (CN); Yuan Li, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 18/164,740

(22) Filed: Feb. 6, 2023

(65) Prior Publication Data

US 2024/0264659 A1    Aug. 8, 2024

(51) Int. Cl.
*G06F 3/01* (2006.01)
*G06F 3/0346* (2013.01)

(52) U.S. Cl.
CPC ............ *G06F 3/011* (2013.01); *G06F 3/0346* (2013.01)

(58) Field of Classification Search
CPC .............................. G06F 3/011; G06T 19/006
See application file for complete search history.

(56) References Cited

U.S. PATENT DOCUMENTS

| 7,706,603 B2 | 4/2010 | Najafi et al. |
| 10,928,888 B2 | 2/2021 | Harvey et al. |
| 2009/0215536 A1* | 8/2009 | Yee ................. A63F 13/211 463/30 |
| 2015/0312426 A1* | 10/2015 | Schoner .............. G06F 16/50 235/375 |
| 2017/0185830 A1 | 6/2017 | Srivastava et al. |
| 2018/0173323 A1* | 6/2018 | Harvey ............... G06F 3/011 |
| 2022/0044016 A1 | 2/2022 | Pan et al. |

FOREIGN PATENT DOCUMENTS

EP    3133468 A1    2/2017

OTHER PUBLICATIONS

"Tetrahedral volume formula", The mathematics of free thought, Zhihu, 2017, 8 pages, English translation.
Li, et al., "IDCam: Precise Item Identification for AR Enhanced Object Interactions", IEEE, 2019, 7 pages.
Xie, et al., "TaggedAR: An RFID-based Approach for Recognition of Multiple Tagged Objects in Augmented Reality Systems", IEEE Transactions on Mobile Commuting, IEEE Xplore Digital Library, 2018, 15 pages.
Xie, et al., "Tell Me What I See: Recognize RFID Tagged Objects in Augmented Reality Systems", UBICOMP '16, Heidelberg, Germany, 2016, 12 pages.

* cited by examiner

*Primary Examiner* — Shivang I Patel
(74) *Attorney, Agent, or Firm* — CANTOR COLBURN LLP; Joseph Curcuru (57) ABSTRACT

Embodiments are related to providing external device communication and localization for virtual reality based equipment using radio-frequency identification (RFID). At least two receivers and a transmitter are used to recognize an external device and determine a location of the external device relative to the headset, based on tags coupled to the external device. A three-dimensional (3D) model is downloaded of the external device based on information received by the at least two receivers from the tags. A location of the external device is matched to the 3D model based on the tags. A virtual image is displayed of the external device corresponding to the location of the external device.

20 Claims, 10 Drawing Sheets

EXTERNAL DEVICE COMMUNICATION WITH VIRTUAL REALITY EQUIPMENT

BACKGROUND

The present invention generally relates to computer systems, and more specifically, to computer-implemented methods, computer systems, and computer program products configured and arranged to provide external device communication and localization for virtual reality (VR) equipment using non-optical signals (e.g., radio-frequency identification (RFID)).

VR is a simulated experience that can employ pose tracking and three-dimensional (3D) near-eye displays to offer the user an immersive feel of a virtual world. Applications of VR include entertainment particularly video games, education, business, etc. Other distinct types of VR-style technology include augmented reality and mixed reality, sometimes referred to as extended reality. VR systems can use VR headsets to generate realistic images, sounds, and other sensations that simulate a user's physical presence in the VR. VR equipment enables a user to look around the artificial world, move around in it, and interact with virtual features or items. The effect is commonly created by VR headsets including of a head-mounted display with a small screen in front of the eyes.

SUMMARY

Embodiments of the present invention are directed to computer-implemented methods for providing external device communication and localization for virtual reality based equipment using RFID. A non-limiting computer-implemented method includes using at least two receivers and a transmitter to recognize an external device and determine a location of the external device relative to the headset, based on tags coupled to the external device. The non-limiting computer-implemented method includes downloading, by the headset, a three-dimensional (3D) model of the external device based on information received by the at least two receivers from the tags and matching, by the headset, a location of the external device to the 3D model based on the tags. Also, the non-limiting computer-implemented method includes displaying, by the headset, a virtual image of the external device corresponding to the location of the external device.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are relevant to aspects of the invention, VR devices, which includes VR displays, VR headsets, and the like are used for working, learning, and playing games. An important features of VR devices is object recognition. The technology behind object recognition is complex but can be summarized by three general operations. In operation one, the VR device generates an image of the object using a camera associated with the VR device. The VR device stores feature descriptors that help identify the reference image. In operation two, the VR device recognizes the object within the real-world environment through feature points. To recognize an object, the camera finds matches between the reference and frame images. In operation three, the object is recognized through an identifiable constellation of point, and a digital model is placed accordingly. Users of the VR device can then interact with and manipulate the 3D digital object. In dim-light environments, VR devices cannot accurately recognize objects such as user input devices, which can include controllers, keyboards, a user's hands, and the like because known VR devices need light for object recognition. However, in very bright environments, the VR device's object-recognition electronic eye can be "fried" or broken or can malfunction. The costs, in terms of processing, development, specialized software, etc., for VR devices to recognize special objects are high. For example, a state-of-the-art VR device can recognize some models of keyboards after it is equipped with a pretrained artificial intelligence (AI) model for this keyboard. Different keyboards need different AI models, where the AI model is an artificial intelligence model pretrained with millions of pictures of the keyboard in order to recognize it. Currently, a state-of-the-art VR device can recognize only about eight keyboards, while there are 6000 or more keyboards available on the market.

Turning now to an overview of aspects of the invention, one or more embodiments of the invention provide computer-implemented methods, computer systems, and computer program products configured and arranged to generate external device communication and localization for a VR-based device using non-optical signals. In some embodiments of the invention, the non-optical signals include radio-frequency identification (RFID). One or more embodiments of the invention are configured to use a RFID and image recognition method to assist VR devices with object recognition. This removes issues associated with dim-light environments and makes it easier to add new external devices, such as keyboards, to the recognized list. In some embodiments of the invention, the non-optical data used to perform object detection also includes pointer data that is also used to, in effect, point the VR deice to a storage location where a corresponding 3D model of the physical external device can be accessed and used by the VR device. Further, one or more embodiments provide a method and system for VR headsets to recognize physical external devices and allow VR users to interact with the external devices. In some embodiments of the invention, two RFID readers/receivers recognize the external device in front of the VR user and determine its location and distance. In some embodiments of the invention, the VR headset utilizes the pointer data and a web interface to locate and download the corresponding 3D model of the external device. The VR headset utilizes the downloaded 3D model to match the visual image and determine the rotation of the external device based on the positioning of the RFID tags on the external device (which can have multiple RFID tags to address difficult recognition, such as a ball-shaped object). The VR headset uses the location, distance, and rotation of the external devices to display a virtual image of the external device in the VR headset and allow the user to interact with the virtual image. Because the recognition of the external device is not solely based on capturing an image of the external device, the user can "see" the external device in dim light and interact with it.

Figure 1:
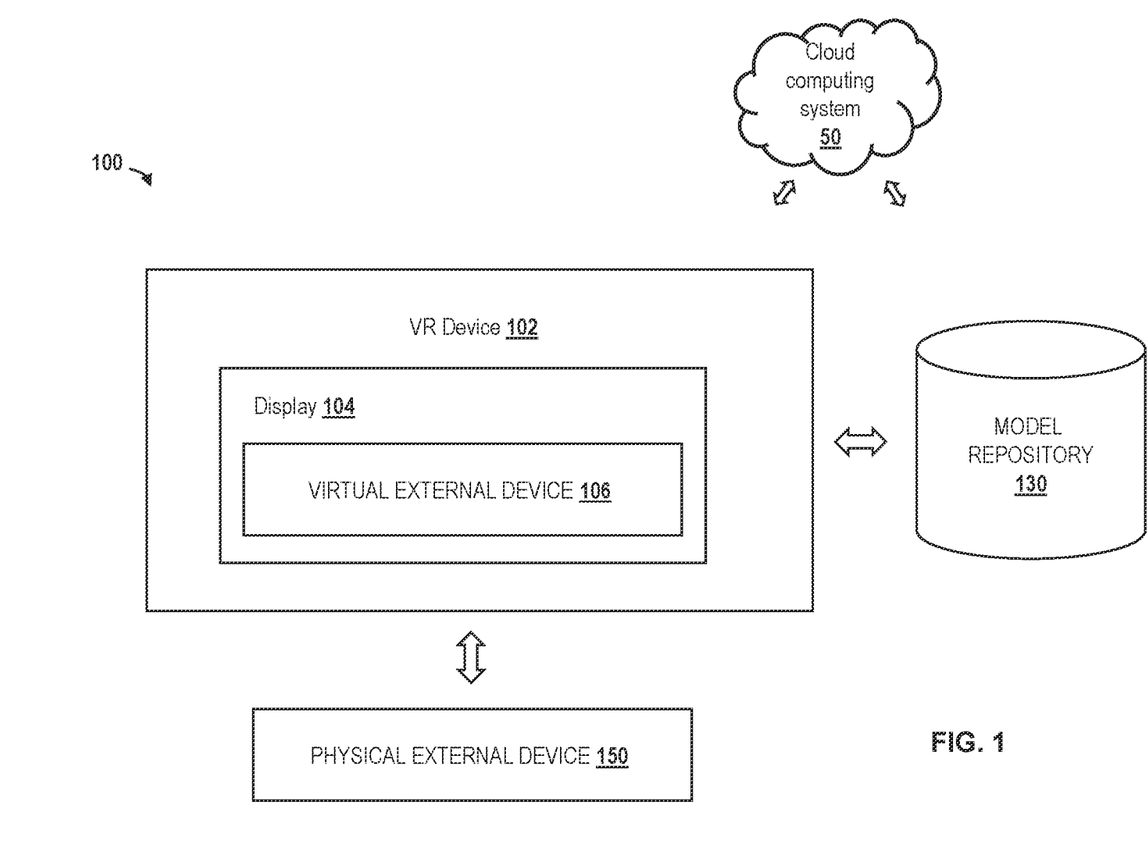
FIG. 1 depicts a block diagram of a system according to one or more embodiments of the present invention.

Turning now to a more detailed description of the aspects of the present invention, FIG. 1 depicts a simplified block diagram illustrating a system 100 in accordance with embodiments of the invention. The system 100 includes a VR device 102 having a display 104. The VR device 102 is configured to display a virtual representation of a physical external device 150 as a virtual external device 106. The virtual external device 106 is a model and/or is based on a model of the physical external device 150 in which the model is obtained from a model repository 130 and/or a cloud computing system 50. In embodiments of the invention, the model repository 130 is operable to store a large number of models for a large number of types of the physical external device 150. For example, where the physical external device 150 is a physical keyboard, there are more than 6000 different types of keyboards available for purchase, and the model repository 130 can be configured to store model that correspond to each of the more than 6000 different types of keyboards. In embodiments of the invention, the VR device 102 is operable to communicate with the physical external device 150 such that "identification" or "pointer data" can be received from the physical external device 150. In embodiments of the invention, the pointer/identification data is non-optical transmitted as non-optical signals. The pointer/identification data, in effect, identifies and points to the model in the model repository 130 that corresponds to and represents (or models) the physical external device 150. In some embodiments of the invention, the model repository 130 is representative of numerous model repositories by different vendors of different physical external devices 150, where each vendor has provided models of its physical external devices 150. In some embodiment of the invention, the VR device 102 includes a web browser that uses the identification/pointer data to locate and download from the model repository 130 the correct model (i.e., the model that is associated with the physical external device 150) over a network (e.g., the internet). In accordance with aspects of the invention, the VR device 102 uses the downloaded or otherwise accessed model, along with additional non-optical data received from the physical external device 150 to generate the virtual external device 106 and make the virtual external device 106 available to a user (not shown) by displaying it on the display 104. The user can interact with the virtual external device 106 through the VR device 102 to perform substantially the same operations the user could perform from interacting directly with the physical external device 150.

A cloud computing system 50 is in wired or wireless electronic communication with the system 100. The cloud computing system 50 can supplement, support or replace some or all of the functionality of the various components of the system 100. Additionally, some or all of the functionality of the system 100 can be implemented as a node of the cloud computing system 50. Additional details of cloud computing features of embodiments of the invention are depicted by the computing environment 900 shown in FIG. 9 and described in greater detail subsequently herein.

Figure 2:
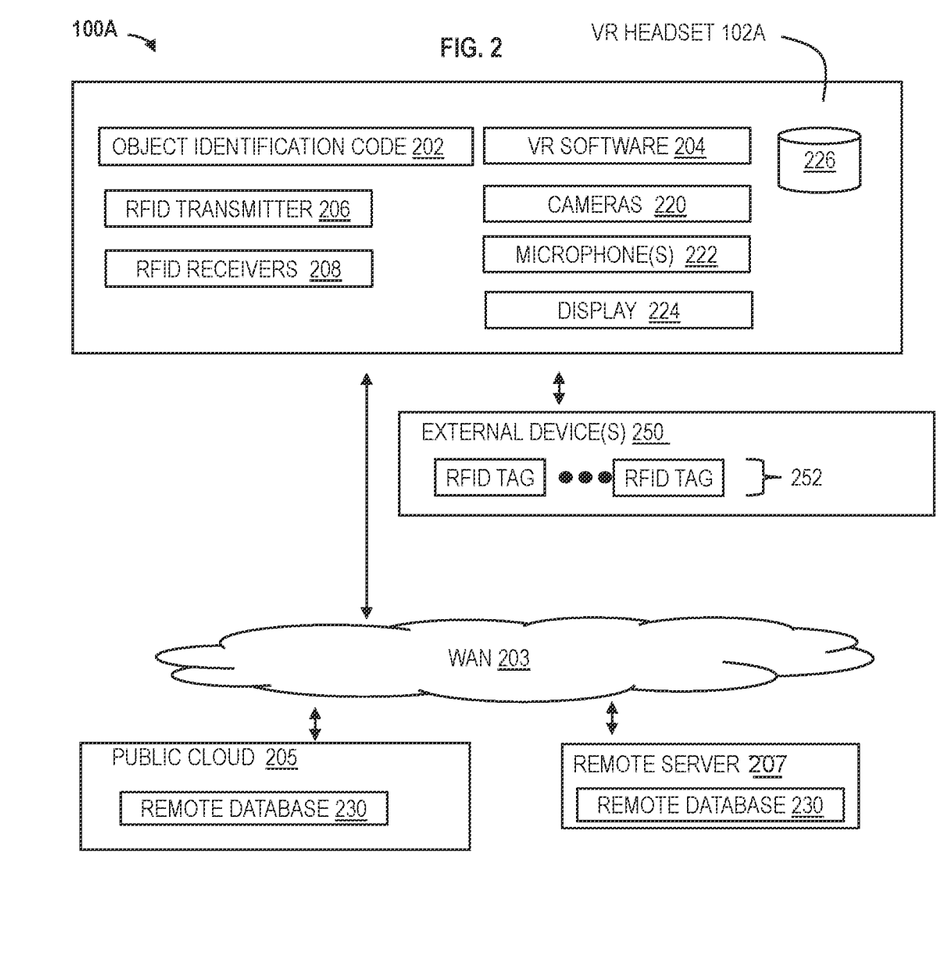
FIG. 2 depicts a block diagram illustrating a more detailed example of how the system shown in FIG. 1 can be implemented according to one or more embodiments of the present invention.

FIG. 2 depicts a non-limiting example of how the system 100 shown in FIG. 1 can be implemented as system 100A. In general, the system 100A depicts additional details of how the system 100 can be implemented. As shown in FIG. 2, the system 100A includes a VR headset 102A as the example of how the VR device 102 (shown in FIG. 1) can be implemented. The VR headset 102A can include various software and hardware components, including but not limited to object identification code 202, VR software 204 for general VR operations known by one of ordinary skill in the art, at least one RFID transmitter 206 configured to transmit electromagnetic waves to RFID tags 252 of an external device 250, and at least two or more RFID receivers 208 configured to receive data from the RFID tags 252 for identification and tracking by the object identification code 202. The RFID tags 252 may be referred to as transmission devices that include a transmitter, a receiver, a memory containing the data to be transmitted, and optionally, a battery. The RFID tags 252 can include a microchip to operate as discussed herein. The RFID receivers 208 are also referred to as readers. The VR headset 102A includes one or more cameras 220, a microphone 222, a display 224, and other peripherals. The VR headset 102A can be coupled to a controller, such as a handheld controller. The VR headset 102A can include functionality and additional features of a computer 901 shown in FIG. 9, and the computer 901 is described in further detail herein.

Figure 4:
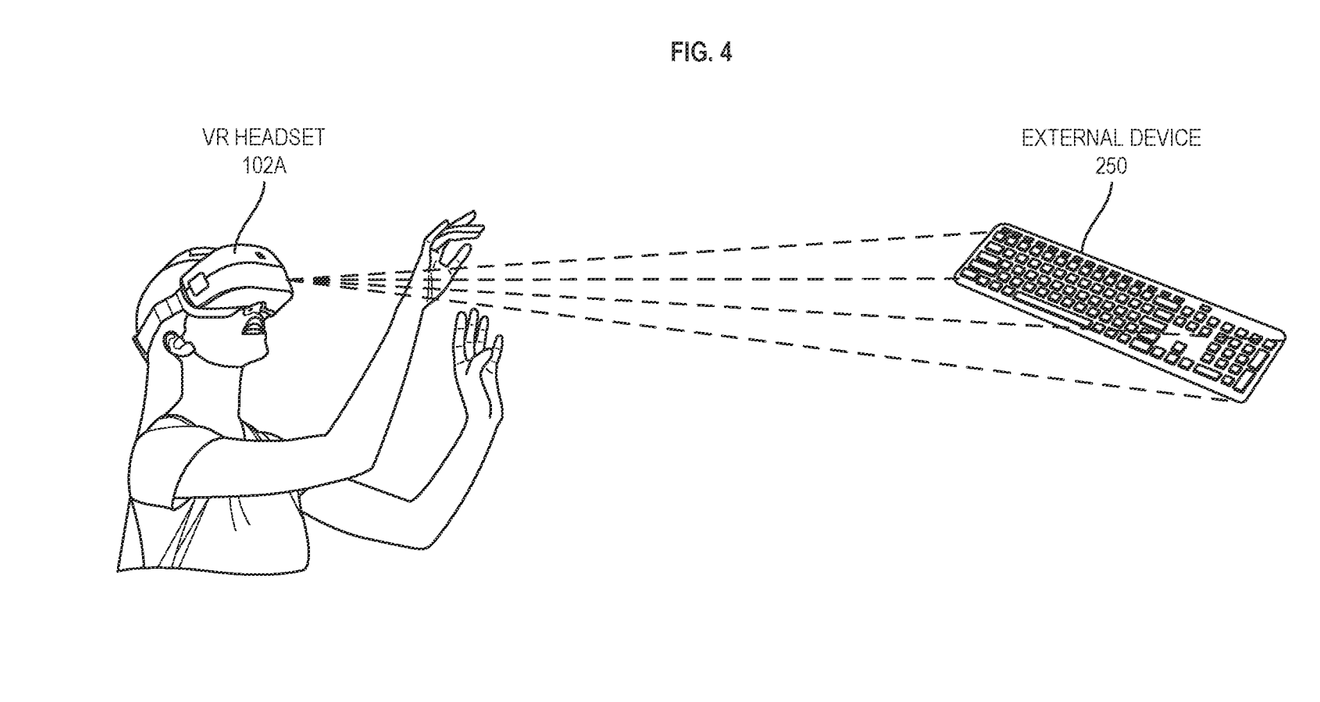
FIG. 4 depicts a diagram illustrating an example of a user operating the systems shown in FIG. 1 and/or FIG. 2 according to one or more embodiments of the present invention.

In FIG. 2, the external device 250 is an example implementation of the external device 150 (shown in FIG. 1) and can represent various types of external devices including keyboards, controllers, etc. In various example scenarios, the external device 250 is depicted as a keyboard for explanation purposes, but it is understood that the external device 250 is not limited to being the keyboard depicted in FIG. 4. The external device 250 can be representative of any 3C product, where 3C is the abbreviation for computer, communication, and consumer electronic products, including mobile phones, personal computers, tablet computers, intelligent wearable devices, digital cameras, audiovisual devices, etc.

The external device 250 includes the RFID tags 252 at fixed locations on the external device 250, and the coordinates of the fixed locations are known to the VR headset 102A by downloading a file having a 3D model of the external device. When triggered by an electromagnetic interrogation pulse from a nearby RFID transmitter, the RFID tag 252 transmits digital data back to a RFID receiver. Each RFID tag 252 contains identifying information of the product, along with website information such as a uniform resource locator (URL) for the product, for example, a keyboard. The RFID tags 252 can have their own power source or the electromagnetic wave can provide power for the RFID tags 252 to send their data back to the RFID receivers 208.

Figure 3:
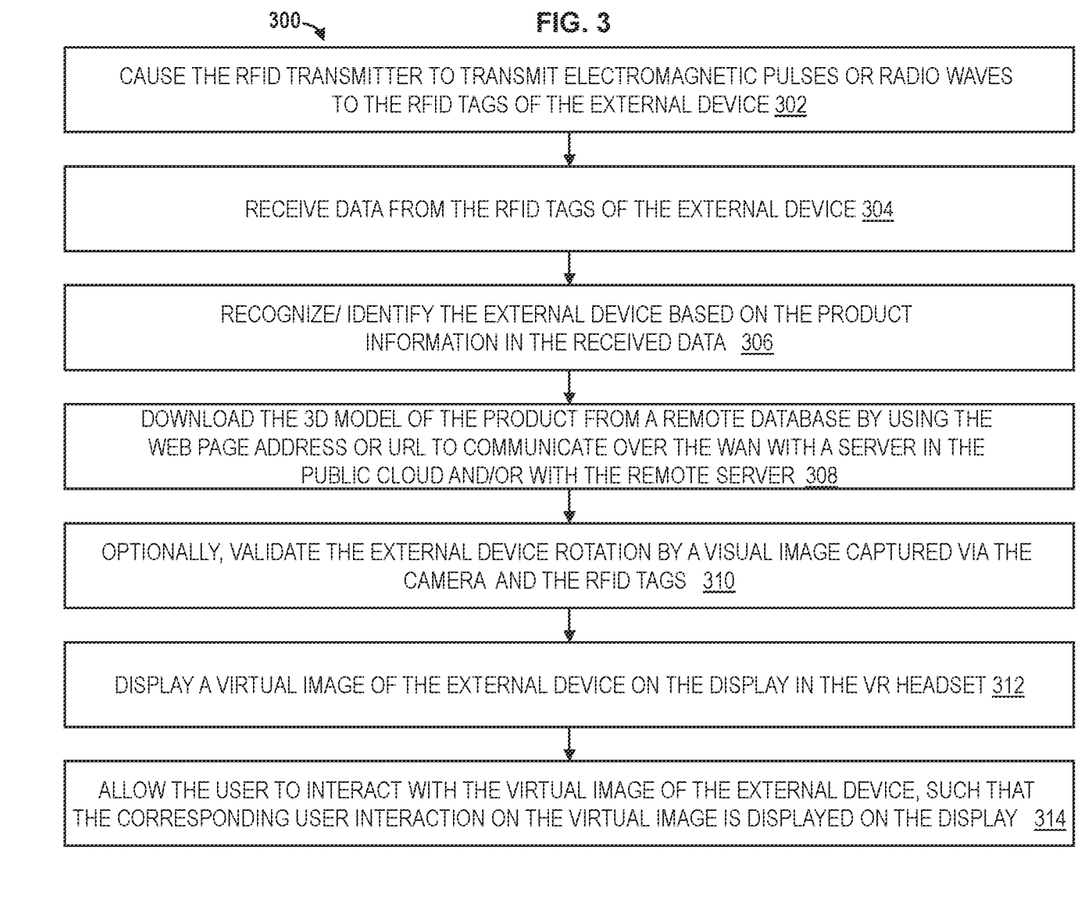
FIG. 3 is a flowchart of a computer-implemented method operable to be implemented by the systems shown in FIG. 1 and/or FIG. 2 according to one or more embodiments of the present invention.

FIG. 3 is a flowchart of a computer-implemented method 300 for external device communication and localization for VR equipment using RFID according to one or more embodiments. The VR headset 102A is positioned in proximity to the external device 250 for communication, for example, sending and receiving electromagnetic waves (i.e., signals) to and from the external device 250.

At block 302 of the computer-implemented method 300, the object identification code 202 is configured to cause the RFID transmitter 206 to transmit electromagnetic pulses or radio waves to the RFID tags 252 of the external device 250. This causes the RFID tags 252 to transmit their data back to the VR headset 102A.

At block 304, the object identification code 202 is configured to receive the data from the RFID tags 252 of the external device 250. The received data includes product information identifying the external device 250. Using the keyboard example, the product information can include the product name ABC, model number 123ABC, version 1, web page address or URL to the three-dimensional (3D) model of the keyboard, etc.

At block 306, the object identification code 202 is configured to recognize/identify the external device 250 based on the product information in the received data. For example, the objection identification code 202 identifies that the external device 250 is a keyboard with product name ABC, model number 123ABC, version 1, etc.

At block 308, the object identification code 202 is configured to download the 3D model of the product from a remote database 230 by using the web page address or URL. The objection identification code 202 can communicate over a WAN 203 with a server in a public cloud 205 and/or with a remote server 207 to download the file containing the 3D model and dimensions including coordinates of the RFID tags 252 on the external device 250. In advance, the vendor of the keyboard or any 3C product builds the 3D model and adds the RFID tags in their products, such that the data from the RFID tag points to their 3D model. The WAN 203, public cloud 205, and remote server 207 can include functionality and additional features of a WAN 902, a public cloud 905, and a remote server 904 respectively shown in FIG. 9. The WAN 902, the public cloud 905, and the remote server 904 are described in further detail herein.

Figure 5:
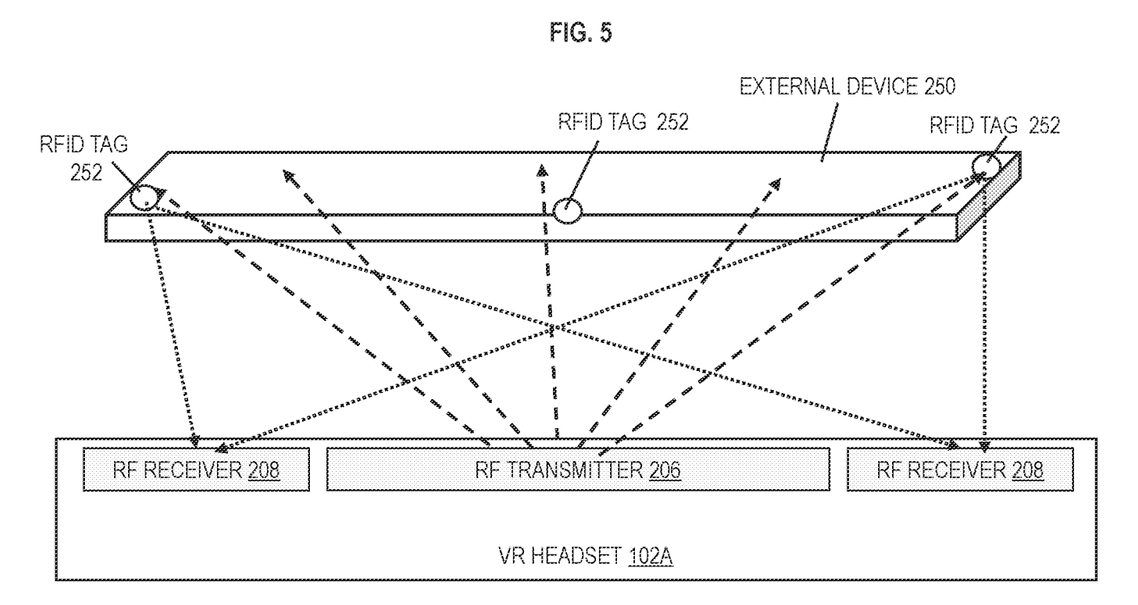
FIG. 5 depicts a block diagram illustrating additional details of a system according to one or more embodiments of the present invention.

At block 310, optionally, the object identification code 202 is configured to validate the external device rotation by a visual image captured via the camera 220 and the RFID tags 252. The VR headset 102A is equipped with at least two RFID receivers 208 to estimate the distance from the product to VR headset 102A and to track movement of the product. For example, the object identification code 202 compares the visual image of the product (e.g., having the downloaded 3D model with fixed positions for the RFID tags) to the locations of the RFID tags 252 being tracked in order to determine the rotation of the external device 250, according to one or more embodiments. Depending on the shape of the product, it may be necessary to use more than one RFID tag to determine the final rotation. FIG. 5 illustrates a block diagram of electromagnetic pulses from the RF transmitter 206 transmitted to the RFID tags 252 and return radio waves transmitting product data back to the RFID receivers 208. Each RFID tag 252 has unique identifying information such that the object identification code 202 can distinguish one RFID tag 252 from another RFID tag 252 and determine the location of one RFID tag 252 relative to other RFID tags 252 on the external device 250. By knowing the time when electromagnetic interrogating pulses are sent from the RFID transmitter 206, the time when return data is received at each of the RFID receivers 208 from respective RFID tags 252, and the fixed locations of the RFID tags, RFID transmitter 206, and RFID receivers 208, the object identification code 202 can determine the location of the external device 250 relative to the VR headset 102A.

At block 312, the object identification code 202 is configured to display a virtual image of the external device 250 on the display 224 in the VR headset 102A. The virtual image of the external device 250 is moved and positioned on the display 224 according to the movements and position of the external device 250.

At block 314, the object identification code 202 in conjunction with the general VR software 204 is configured to allow the user to interact with the virtual image of the external device, such that the corresponding user interaction on the virtual image is displayed on the display 224. Based on the 3D model of the keyboard, which includes information about interactive parts of corresponding actions, the object identification code 202 in conjunction with the general VR software 204 allows the user to interact with the physical product, such as typing on the keyboard, while simultaneously displaying the interaction with the virtual image of the keyboard on the display 224 of the VR headset 102A.

Figure 6:
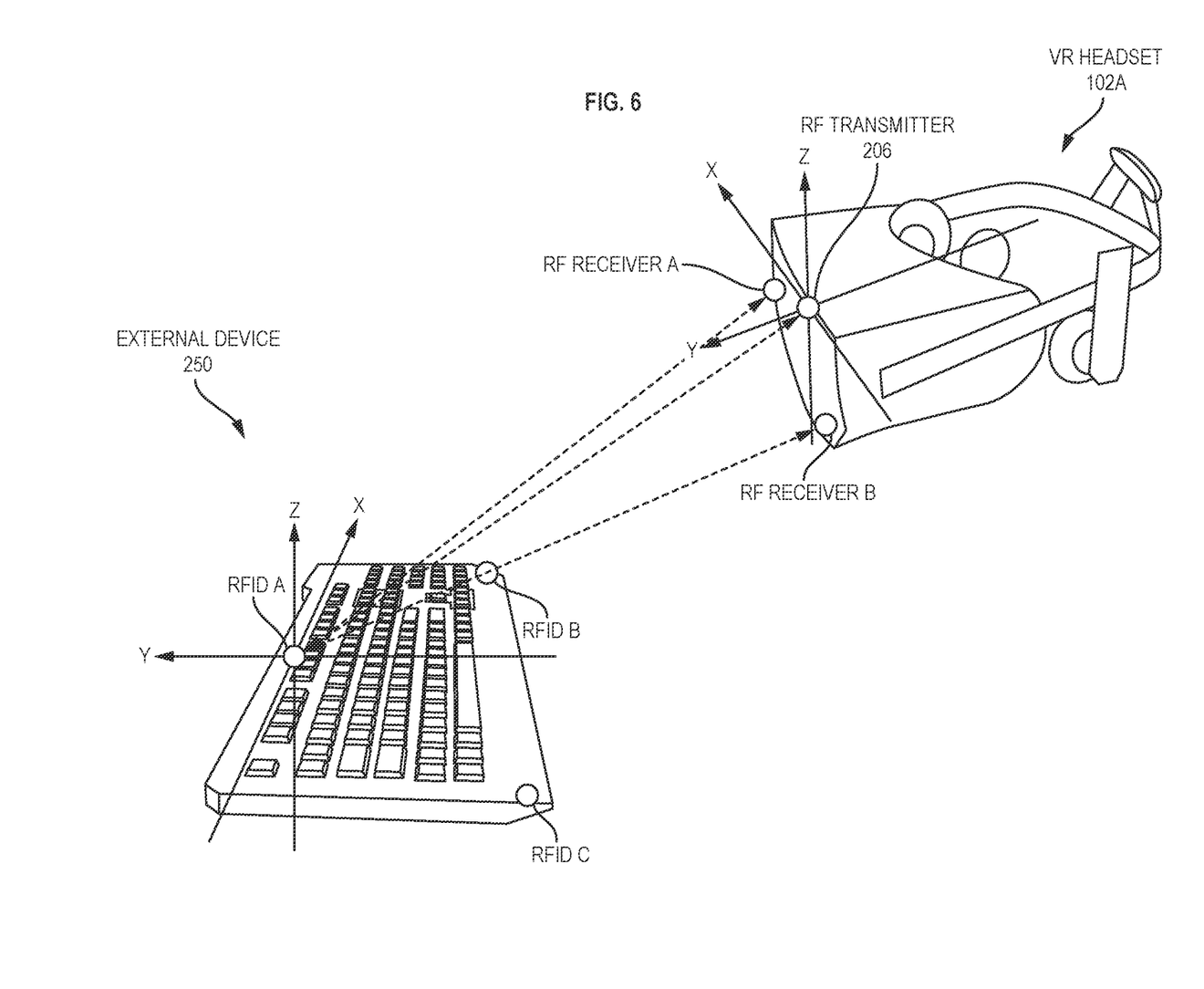
FIG. 6 depicts a diagram illustrating additional details of a system according to one or more embodiments of the present invention.

FIG. 6 is a diagram illustrating positions of the RF transmitter 206 and RF receivers, which are shown as RF Receiver-A and RF-Receiver-B, on the VR headset 102A and the RFID tags, which are shown in FIG. 6 as RFID-A, RFID-B, RFID-C, in order to determine the location and rotation of the external device 250 according to one or more embodiments. It should be appreciated that the object identification code 202 (shown in FIG. 2) can use various techniques to determine the location and rotation of the physical external device 250.

In FIG. 6, the relative positions of the RF transmitter 206 and two RF receivers (RF Receiver-A, RF Receiver-B) on the VR headset 102A are predefined in advance and known by the object identification code 202 (shown in FIG. 2). It is assumed that the RF transmitter 206 is the original point (e.g., center point). Also, the object identification code 202 has the coordinates of the RF receiver-A and RF receiver-B in advance.

Referring to FIG. 6, for the physical external device 250 (e.g., a keyboard), the relative positions of the three RFID tags, which are shown as RFID-A, RFID-B, RFID-C, on the physical external device 250 are predefined in advanced. In this particular example, the physical external device 250 is a keyboard to merely provide an explanation and clear example, and is not intended to limit the scope of aspects disclosed herein. It is assumed that RFID-A is the original point (e.g., center point). Because of the returned product data from the RFID tags (RFID-A, RFID-B, RFID-C), the object identification code 202 (shown in FIG. 2) has the 3D model file of the keyboard as well as the coordinates of RFID-B and RFID-C from the model repository 130, along with RFID-A. In other words, the object identification code 202 is configured to determine that the RFID-A is in the center of the keyboard based on the time of flight of the signals to the RF Receiver-A and RF Receiver-B and then determine the exact location of the other RFID tags, RFID-B and RFID-C, based on the known coordinates. Because the object identification code 202 knows the time it takes to receive the returned signals from the RFID-A to each of the RF Receiver-A and the RF Receiver-B and knows the distance (i.e., coordinates of RF Receiver-A, RF Receiver-B, and the RF transmitter 206), the object identification code 202 can determine the approximate location of the RFID-A and that it is between the RFID-B, RFID-B, and RFID-C. Accordingly, using the downloaded 3D model of the keyboard, the object identification code 202 can display on display 224 (shown in FIG. 2) the virtual image of the keyboard (e.g., virtual external device 106 shown in FIG. 1) (which is the 3D model) at the same position and rotation as the physical keyboard.

Figures 7A, 7B:
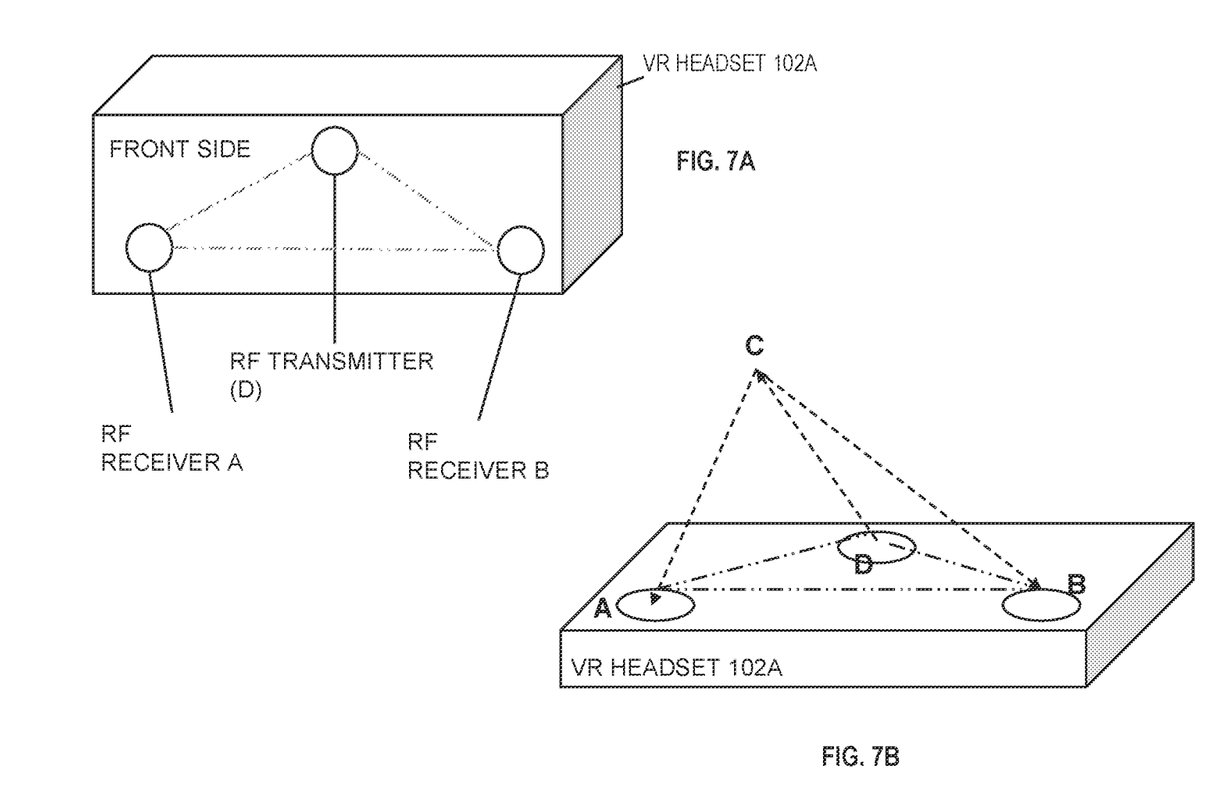
FIG. 7A depicts a block diagram illustrating additional details of a system according to one or more embodiments of the present invention.
FIG. 7B depicts a block diagram illustrating additional details of a system according to one or more embodiments of the present invention.
Figure 7C:
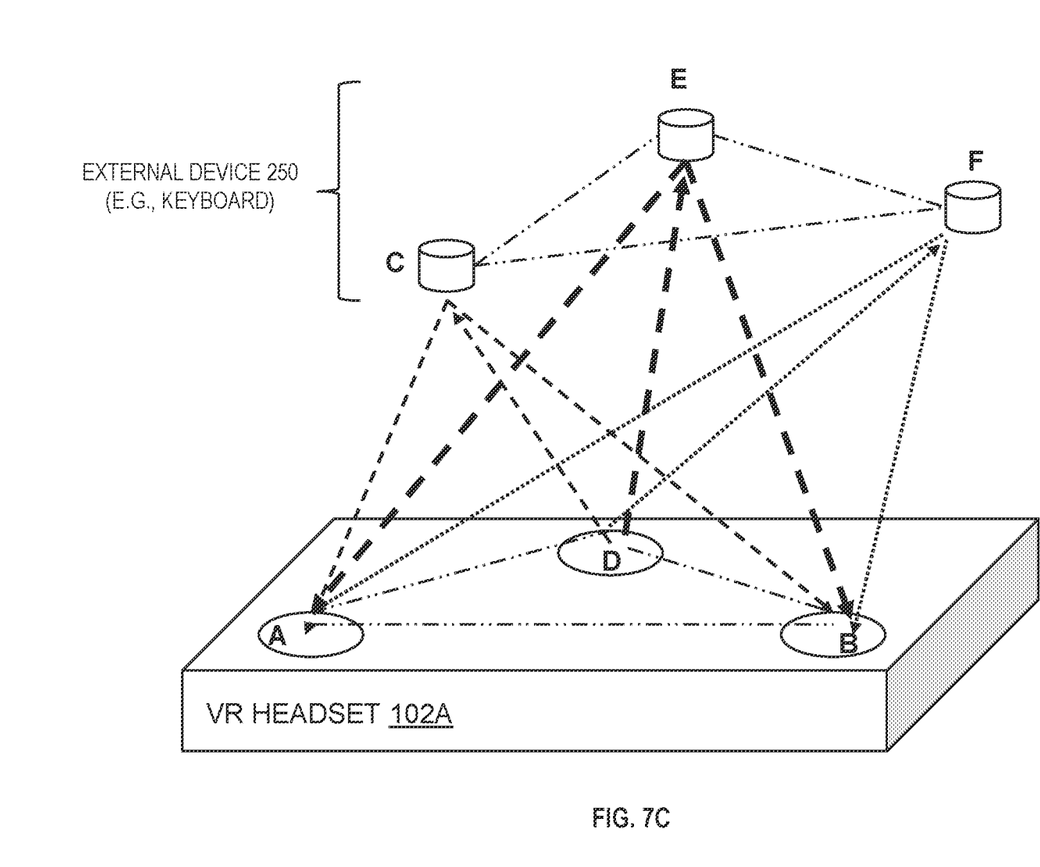
FIG. 7C depicts a block diagram illustrating additional details of a system according to one or more embodiments of the present invention.

FIGS. 7A, 7B, and 7C depict block diagrams of obtaining the location, positions, and/or rotation of the external device in order to display a virtual image of the external device according to one or more embodiments. FIG. 7A depicts the receivers and transmitters at fixed locations. FIG. 7B depicts the receivers and transmitters forming a tetrahedron with an example RFID tag. FIG. 7C depicts the receivers and transmitters of the VR headset in geometric relationships with and communicating with the RFID tags of the external device 250.

In FIG. 7B, it is assumed that AB=a, BD=b, AD=c, t0=timestamp when the RFID transmitter sends the electromagnetic wave, t1=timestamp when the RF receiver A receives the signal from RFID tag C, and t2=timestamp when RF receiver B receives the signal from RFID tag C. Then, there will be CD+CA=(t1−t0)*c and CD+CB=(t2−t0)*c. It is assumed that AD, AB, BD, CE, EF, are CF are known.

According to the time interval from the signal, there are CD+AC, CD+CB, etc., depicted in FIG. 7C To obtain the individual value of the distances AC and CD, the object identification code 202 adds the timestamp as well for RFID tag C when the RF receiver A receives the return signal from RFID tag C and when the RF receiver B receives the return signal from RFID tag C; the same occurs for RFID tag E and RFID tag F. To overcome the clock difference, VR headset can synchronize the clock of the target object if necessary.

It is assumed that ADBC is considered as a tetrahedron, and with the help of Euler's method, the object identification code 202 can calculate the volume of ADBC because the object identification code 202 already knows the distances AD, AB, BD, AC, BC, and DC. When the object identification code 202 builds/uses a 3D coordinate system with D as the origin point, the object identification code 202 can know the relative position of C. Further, the RFID A and RFID B send the electromagnetic waves at a fixed rate (e.g., 60 hertz (Hz)) in response to receiving the electromagnetic pulses from the RF transmitter, and the object identification code 202 can obtain the movement of C in real time. By analogy, this method can be applied to tetrahedron ADBE to obtain the real-time position of E, and tetrahedron ADBF to obtain the real-time position of F. Then, the object identification code 202 is ready to generate the transformation matrix (or pose) of the target object (i.e., keyboard) by using the determined coordinates of the RFID tags C, E, and F at fixed locations on the keyboard. The object identification code 202 has vectors for each of the tetrahedron. The transformation matrix is a matrix that transforms one vector into another vector by the process of matrix multiplication. The transformation matrix alters the cartesian system and maps the coordinates of the vector to the new coordinates.

As previously noted, the object identification code 202 downloads the 3D model (e.g., in a file) of the target object from the Internet, for example, from the remote database 230 of the vendor using the WAN 203, according to the information received from the RFID tags 252. The object identification code 202 stores the 3D model in its internal database 226 in memory. With the transform matrix calculated above for the cartesian system of the display 224 of the VR headset 102A, the object identification code 202 can render the virtual image of the keyboard on its display 224 with real-time changes being made to the external device 250 (e.g., the keyboard). Because the object identification code 202 already contains depth information, the user can place the user's hand between the external device 250 and VR headset 102A. The VR headset 102A transmits electromagnetic waves that are able to penetrate the user's hands and/or goes around (e.g., using multiple paths), so that the user does not have to worry that the object identification code 202 will lose the position of the external device 250.

Figure 8:
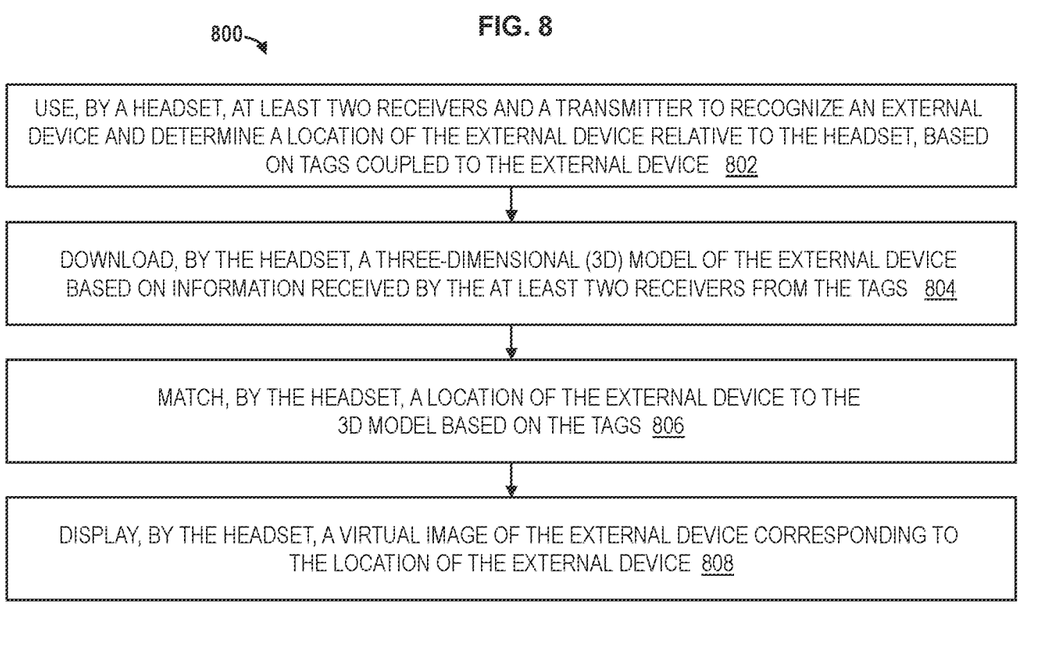
FIG. 8 is a flowchart of a computer-implemented method operable to be implemented by any of the systems described and/or illustrated herein according to one or more embodiments of the present invention.

FIG. 8 is a flowchart of a computer-implemented method 800 for providing external device communication and localization for virtual reality based equipment using RFID according to one or more embodiments. Reference can be made to any of the figures discussed herein. At block 802 of the computer-implemented method 800, the VR headset 102A is configured to use/cause at least two receivers 208 and a transmitter 206 to recognize an external device 250 and determine a location of the external device 250 relative to the virtual reality headset 102A, based on non-optical signals transmitted to and received from RFID tags 252 (e.g., transmission devices) coupled to the external device 250. At block 804, the VR headset 102A is configured to select, access, and download a 3D model of the external device 250 based on recognition data (e.g., pointer data) in the non-optical signals received by the at least two receivers from the tags. At block 806, the VR headset 102A is configured to compare and match a physical location of the external device 250 to (the virtual image of) the 3D model based on the RFID tags 252. At block 808, the VR headset 102A is configured to display a virtual image of the external device 250 corresponding to the physical location of the external device 250.

Further, in one or more embodiments, the VR headset 102A is configured to determine a rotation of the external device based on the RFID tags 252 coupled to the external device 250. The VR headset 102A is configured to match a rotation of the external device 250 to (a rotation of) the 3D model. The VR headset 102A is configured to determine a distance of the external device 250 relative to the VR headset 102A, based on the RFID tags 252 coupled to the external device 250. The virtual image is displayed according to the location, a rotation, and a distance of the external device 250 relative to the VR headset 102A, where the location, the rotation, and the distance are based at least in part on a relationship between the at least two receivers 208, the transmitter 206, and the tags 252. The recognition data describes a type of the external device 250 and provides a uniform resource locator (URL) to download the 3D model. The external device 250 includes a keyboard.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
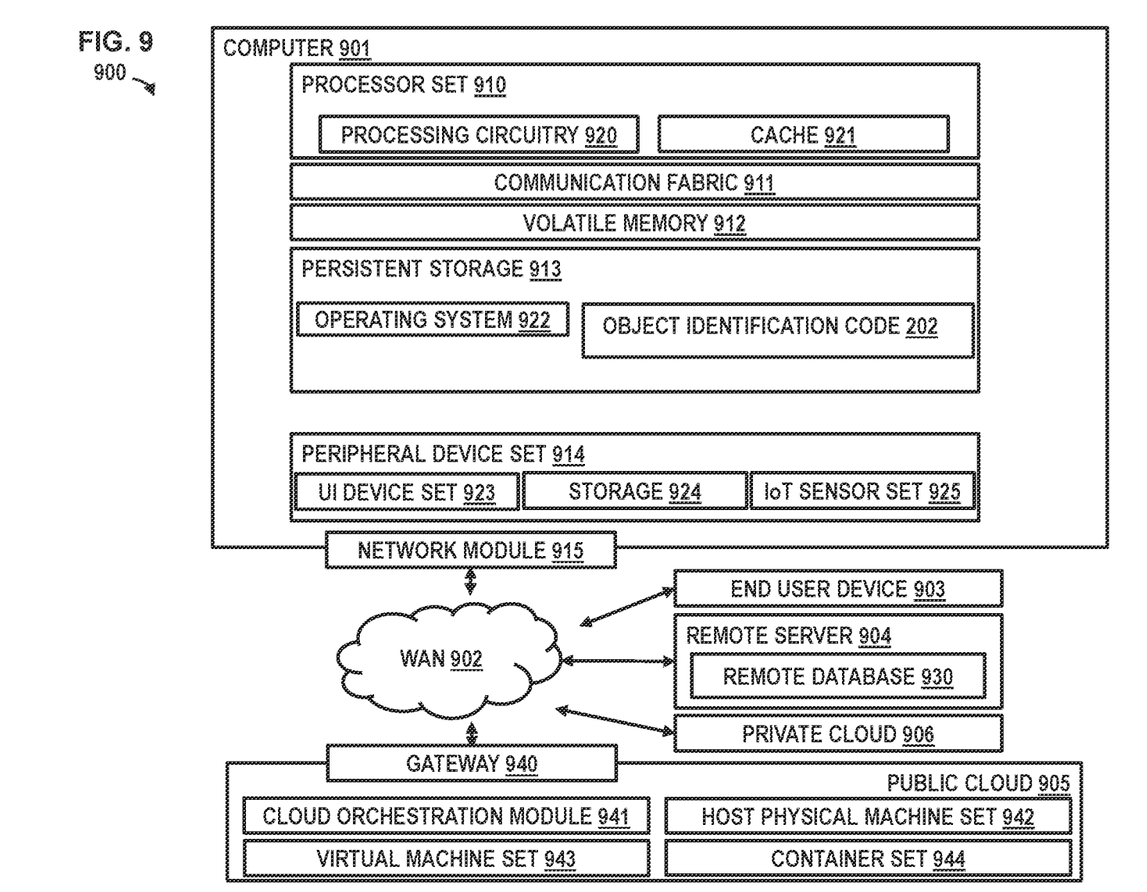
FIG. 9 depicts a block diagram of an example computing environment for use in conjunction with one or more embodiments of the present invention.

Computing environment 900 contains an example of an environment for the execution of at least some of the computer code involved in performing the inventive methods, such as packet optimization code 202. In addition to object identification code 202, computing environment 900 includes, for example, computer 101, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and object identification code 202, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 1. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in object identification code 202 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in object identification code 202 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, by a processor of a virtual reality (VR) device, non-optical signals comprising pointer data transmitted from an external device;
capturing an image of the external device;
using, by the processor, the pointer data to select and access a model of the external device, wherein the non-optical signals are received from fixed positions on the external device, the model of the external device comprising coordinates of the fixed positions on the external device;
determining, by the processor, a location of the external device, based on the non-optical signals transmitted from the external device;
validating a rotation of the external device based on the image captured of the external device and the fixed positions from which the non-optical signals are received from the external device; and
generating, by the processor, a virtual representation of the external device based at least in part on the location, the rotation, and the model.

2. The computer-implemented method of claim 1 further comprising determining a rotation of the external device based on transmission devices coupled to the external device, the transmission devices being configured to transmit the non-optical signals.

3. The computer-implemented method of claim 1 further comprising matching the virtual representation to the rotation of the external device.

4. The computer-implemented method of claim 1 further comprising determining a distance of the external device relative to the VR device, based on transmission devices coupled to the external device, the transmission devices being configured to transmit the non-optical signals.

5. The computer-implemented method of claim 1, wherein:
the virtual representation is displayed according to the location, the rotation, and a distance of the external device relative to the VR device, the VR device comprising at least two receivers and a transmitter;
transmission devices are coupled to the external device; and
the location, the rotation, and the distance are based at least in part on a relationship between the at least two receivers, the transmitter, and the transmission devices.

6. The computer-implemented method of claim 1, wherein the pointer data comprises a type of the external device and a uniform resource locator (URL) to access the model.

7. The computer-implemented method of claim 1, wherein the external device comprises a keyboard having the fixed positions for the non-optical signals.

8. A system for a virtual reality (VR) device comprising:
a memory having computer readable instructions; and
a computer for executing the computer readable instructions, the computer readable instructions controlling the computer to perform operations comprising:
receiving, by the computer, non-optical signals comprising pointer data transmitted from an external device;
capturing an image of the external device;
using, by the computer, the pointer data to select and access a model of the external device, wherein the non-optical signals are received from fixed positions on the external device, the model of the external device comprising coordinates of the fixed positions on the external device;
determining, by the computer, a location of the external device, based on the non-optical signals transmitted from the external device;
validating a rotation of the external device based on the image captured of the external device and the fixed positions from which the non-optical signals are received from the external device; and
generating, by the computer, a virtual representation of the external device based at least in part on the location, the rotation, and the model.

9. The system of claim 8, wherein the operations further comprise determining a rotation of the external device based on transmission devices coupled to the external device, the transmission devices being configured to transmit the non-optical signals.

10. The system of claim 8, wherein the operations further comprise matching the virtual representation to the rotation of the external device.

11. The system of claim 8, wherein the operations further comprise determining a distance of the external device relative to the VR device, based on transmission devices coupled to the external device, the transmission devices being configured to transmit the non-optical signals.

12. The system of claim 8, wherein:
the virtual representation is displayed according to the location, the rotation, and a distance of the external device relative to the VR device, the VR device comprising at least two receivers and a transmitter;
transmission devices are coupled to the external device; and
the location, the rotation, and the distance are based at least in part on a relationship between the at least two receivers, the transmitter, and the transmission devices.

13. The system of claim 8, wherein the pointer data comprises a type of the external device and a uniform resource locator (URL) to access the model.

14. The system of claim 8, wherein the external device comprises a keyboard having the fixed positions for the non-optical signals.

15. A computer program product comprising a computer readable storage medium having program instructions embodied therewith, the program instructions executable by a computer of a virtual reality (VR) device to cause the computer to perform operations comprising:
receiving, by the computer, non-optical signals comprising pointer data transmitted from an external device;
capturing an image of the external device;
using, by the computer, the pointer data to select and access a model of the external device, wherein the non-optical signals are received from fixed positions on the external device, the model of the external device comprising coordinates of the fixed positions on the external device;
determining, by the computer, a location of the external device, based on the non-optical signals transmitted from the external device;
validating a rotation of the external device based on the image captured of the external device and the fixed positions from which the non-optical signals are received from the external device; and
generating, by the computer, a virtual representation of the external device based at least in part on the location, the rotation, and the model.

16. The computer program product of claim 15 further comprising determining a rotation of the external device based on transmission devices coupled to the external device, the transmission devices being configured to transmit the non-optical signals.

17. The computer program product of claim 15 further comprising matching the virtual representation to the rotation of the external device.

18. The computer program product of claim 15 further comprising determining a distance of the external device relative to the VR device, based on transmission devices coupled to the external device, the transmission devices being configured to transmit the non-optical signals.

19. The computer program product of claim 15, wherein:
- the virtual representation is displayed according to the location, the rotation, and a distance of the external device relative to the VR device, the VR device comprising at least two receivers and a transmitter;
- transmission devices are coupled to the external device; and
- the location, the rotation, and the distance are based at least in part on a relationship between the at least two receivers, the transmitter, and the transmission devices.

20. The computer program product of claim 15, wherein the pointer data comprises a type of the external device and a uniform resource locator (URL) to access the model.

\* \* \* \* \*